US009617446B2

(12) United States Patent
Pompignano et al.

(10) Patent No.: US 9,617,446 B2
(45) Date of Patent: Apr. 11, 2017

(54) ADHESION PROMOTER RESIN COMPOSITIONS AND COATING COMPOSITIONS HAVING THE ADHESION PROMOTER RESIN COMPOSITIONS

(75) Inventors: Gary Pompignano, Wadsworth, OH (US); David John Dyer, Evesham (GB); Stuart Higgs, Walsall (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 294 days.

(21) Appl. No.: 13/997,716

(22) PCT Filed: Dec. 23, 2011

(86) PCT No.: PCT/EP2011/073935
§ 371 (c)(1),
(2), (4) Date: Jun. 25, 2013

(87) PCT Pub. No.: WO2012/089657
PCT Pub. Date: Jul. 5, 2012

(65) Prior Publication Data
US 2013/0324652 A1    Dec. 5, 2013

Related U.S. Application Data

(60) Provisional application No. 61/427,863, filed on Dec. 29, 2010.

(30) Foreign Application Priority Data

Feb. 10, 2011 (EP) .................................. 11154058

(51) Int. Cl.
| B32B 27/18 | (2006.01) |
| B32B 27/38 | (2006.01) |
| B05D 1/00 | (2006.01) |
| C09D 7/12 | (2006.01) |
| C09D 123/00 | (2006.01) |
| C09D 133/00 | (2006.01) |
| C09D 163/00 | (2006.01) |
| C09D 167/00 | (2006.01) |
| C09D 169/00 | (2006.01) |
| C09D 175/02 | (2006.01) |
| C09D 175/04 | (2006.01) |
| C09D 147/00 | (2006.01) |
| C08G 59/02 | (2006.01) |
| C08G 59/14 | (2006.01) |
| C09D 163/08 | (2006.01) |
| B32B 15/08 | (2006.01) |
| B05D 3/00 | (2006.01) |
| C08L 63/08 | (2006.01) |

(52) U.S. Cl.
CPC ......... *C09D 147/00* (2013.01); *C08G 59/027* (2013.01); *C08G 59/1422* (2013.01); *C09D 7/125* (2013.01); *C09D 163/00* (2013.01); *C09D 163/08* (2013.01); *C08L 63/08* (2013.01)

(58) Field of Classification Search
None
See application file for complete search history.

(56) References Cited

U.S. PATENT DOCUMENTS

| 3,268,620 | A |   | 8/1966  | Tarwid           |
| 4,164,487 | A |   | 8/1979  | Martin           |
| 4,251,414 | A |   | 2/1981  | Nakada et al.    |
| 4,487,860 | A |   | 12/1984 | Winner et al.    |
| 4,522,961 | A |   | 6/1985  | Martino et al.   |
| 5,128,391 | A |   | 7/1992  | Shustack         |
| 5,344,858 | A | * | 9/1994  | Hart et al. ............. 523/411 |
| 2003/0004231 | A1 |   | 1/2003  | Ehmann et al.    |

(Continued)

FOREIGN PATENT DOCUMENTS

| CN | 1454245 A   | 11/2003 |
| CN | 101573418 A | 11/2009 |

(Continued)

OTHER PUBLICATIONS

Lezhenina G.N. et al, "Modifying Additive for Water-Based Polyorganosiloxane Polymer and Copolymer of Butadiene with Styrene." WPI/Thomson, vol. 2011,No. 37, Jun. 10, 2010, pp. XP002650580.
International Search Report and Written Opinion dated Jan. 22, 2013 for related PCT Application No. PCT/EP2011/073935.
Kiplinger, Jon, "Phosphate polymerizable adhesion promoters.," JCT Coatings Tech, Issue No. 1547-0083, Feb. 1, 2005.
English abstract of De 30 09 715 A1 published Oct. 16, 1980.
English abstract of RU 2 391 368 C1 published Jun. 10, 2010.
English abstract of JP 53-88038 published Aug. 3, 1978.
English abstract of JP 54-3885 published Jan. 12, 1979.
English abstract of JP 62-4755 A published Jan. 10, 1987.
English abstract of JP 62-4756 A published Jan. 10, 1987.
English translation of JP 7-206981 A published Aug. 8, 1995.

(Continued)

*Primary Examiner* — Michael J Feely
(74) *Attorney, Agent, or Firm* — Alice C. Su

(57) ABSTRACT

Coating compositions are disclosed having a non-bisphenol A based film forming resin and an adhesion promoter resin. The coating compositions provide an alternate to epoxy resins that still allow melamine formaldehyde free cure, blush resistance, capability to retort and can withstand hard-to-hold beverages. In some embodiments, the coating compositions are used to coat substrates such as cans and packaging materials for the storage of food and beverages. Substrates can be coated by preparing an adhesion promoter composition by a method including mixing an epoxidized resin and a solvent to form a mixture, adding a phosphoric acid compound to the resulting mixture to form a phosphate ester, adding water to partially hydrolyze the phosphate ester, and adding a neutralizer to form the adhesion promoter resin, followed by blending the adhesion promoter resin with a non-bisphenol A based film forming resin to form a coating composition, and applying the coating composition to the substrate.

15 Claims, 3 Drawing Sheets

(56) References Cited

U.S. PATENT DOCUMENTS

| | | | |
|---|---|---|---|
| 2007/0087146 A1* | 4/2007 | Evans | C08G 59/182 428/35.7 |
| 2007/0088111 A1 | 4/2007 | Maksimovic et al. | |
| 2008/0090069 A1* | 4/2008 | Walters et al. | 428/330 |
| 2010/0323116 A1 | 12/2010 | Urbano et al. | |
| 2012/0301645 A1 | 11/2012 | Moussa et al. | |
| 2012/0301646 A1 | 11/2012 | List et al. | |
| 2012/0301647 A1 | 11/2012 | Moussa et al. | |
| 2012/0301738 A1 | 11/2012 | Posey | |

FOREIGN PATENT DOCUMENTS

| | | |
|---|---|---|
| DE | 30 09 715 A1 | 10/1980 |
| EP | 1 818 349 A1 | 8/2007 |
| EP | 2 080 790 A1 | 7/2009 |
| EP | 2 199 315 A1 | 6/2010 |
| GB | 2 052 526 A | 1/1981 |
| GB | 1 597 610 | 9/1981 |
| JP | 53-88038 | 8/1978 |
| JP | 54-3885 | 1/1979 |
| JP | 62-4755 A | 1/1987 |
| JP | 62-4756 A | 1/1987 |
| JP | 7-206981 A | 8/1995 |
| JP | 2006-316104 A | 11/2006 |
| KR | 10-0725249 B1 | 5/2007 |
| RU | 2 391 368 C1 | 6/2010 |
| WO | WO 2010/097353 A1 | 9/2010 |
| WO | WO 2010/100121 A1 | 9/2010 |
| WO | WO 2010/100122 A1 | 9/2010 |

OTHER PUBLICATIONS

English translation of JP 2006-316104 A published Nov. 24, 2006.
European Search Report dated Jul. 27, 2011 for related Application No. 1154058.9.
International Preliminary Report on Patentability dated Jun. 14, 2013 for related Application No. PCT/EP2011/073935.
English abstract of KR 10-072249 B1 published May 29, 2007.

* cited by examiner

Example 2A surface: relatively smooth

Example 2B surface: multiple pits and craters in surface

Example 2C surface: relatively smooth

Example 2D surface: relatively smooth

Example 2E surface: relatively smooth

ADHESION PROMOTER RESIN COMPOSITIONS AND COATING COMPOSITIONS HAVING THE ADHESION PROMOTER RESIN COMPOSITIONS

This application is the U.S. National Phase of PCT/EP2011/073935 filed on Dec. 23, 2011 and claims the benefit of U.S. Provisional Application No. 61/427,863 filed on Dec. 29,2010 and European Application No. 1154058.9 filed on Feb. 10, 2011, the entire contents of each of which are incorporated herein by reference.

BACKGROUND OF THE INVENTION

1. Field of the Invention

The present invention relates to adhesion promoter resin compositions, coating compositions having the adhesion promoter resin compositions, methods of coating substrates with coating compositions, and substrates coated with coating compositions.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

Many coating compositions that do not contain bisphenol A or any other endocrine disruptors have not achieved the performance of epoxy based coatings and have not been successfully used on a commercial basis in food and beverage coating compositions. Some drawbacks have been delamination, flavor acceptance in beer and blush performance in pasteurized or retorted hard-to-hold beverages.

Commonly-owned U.S. Pat. No. 4,522,961 describes coating compositions having an epoxy-acrylic copolymer and up to 50 wt % of a phosphated polymer. The examples of U.S. Pat. No. '961 indicate that better results are obtained when the coating composition has a high amount of the epoxy-acrylic copolymer and a low amount of the phosphated polymer. Such results are obtained because the epoxy-acrylic copolymer has inherently good adhesion at such high levels. However, U.S. Pat. No. '961 does not explain how to obtain a coating composition that has acceptable adhesion without using an epoxy-acrylic copolymer.

There is a need to produce coating compositions that do not contain bisphenol A or are substantially free of bisphenol A. The adhesion promoter resin compositions of the invention can be used in the preparation of coating compositions suitable, inter alia, as packaging coatings for food and beverage packaging and containers.

SUMMARY OF THE INVENTION

The present invention provides an alternate to epoxy resins that still allows melamine formaldehyde free cure, blush resistance, capability to retort and can withstand hard-to-hold beverages. The coating compositions of the invention can be made with a simple process, not requiring multiple polymers or processing stages to achieve the intended effect.

The present invention includes coating compositions and methods for forming coating compositions comprising a non-bisphenol A based film forming resin and an adhesion promoter composition. The present invention also includes methods of coating a substrate comprising: a) preparing an adhesion promoter composition by a method comprising: i) mixing an epoxidized resin and a solvent to form a mixture; ii) adding a phosphoric acid compound to the resulting mixture to form a phosphate ester; iii) adding water to partially hydrolyze the phosphate ester; and iv) adding a neutralizer to form the adhesion promoter resin; b) blending the adhesion promoter resin with a non-bisphenol A based film forming resin to form a coating composition; and c) applying the coating composition to the substrate.

In addition, the present invention includes coating compositions prepared by a method comprising: a) preparing an adhesion promoter composition by a method comprising: i) mixing an epoxidized resin and a solvent to form a mixture; ii) adding a phosphoric acid compound to the resulting mixture to form a phosphate ester; iii) adding water to partially hydrolyze the phosphate ester; and iv) adding a neutralizer to form the adhesion promoter resin; b) blending the adhesion promoter resin with a non-bisphenol A based film forming resin to form a coating composition.

Still further, the present invention includes cans and packaging coated by the methods and including the coating compositions of the present invention.

DETAILED DESCRIPTION OF THE INVENTION

The present invention includes substrates coated at least in part with a coating composition of the invention and methods for coating the substrates. The term "substrate" as used herein includes, without limitation, cans, metal cans, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The present invention includes adhesion promoter resin compositions comprising a phosphoric acid compound, an epoxidized resin (which may be aliphatic or aromatic), or a combination thereof. The compositions may also include a solvent and a neutralizer.

Figure 1:
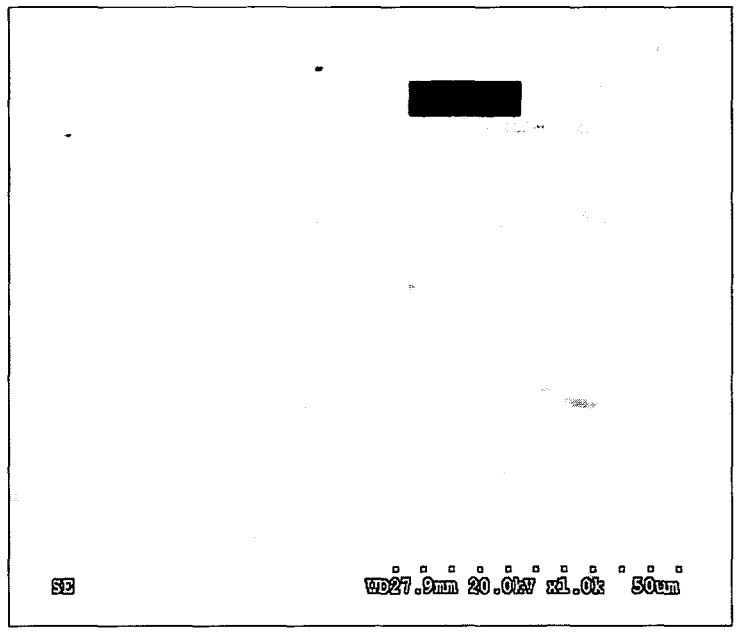
FIG. 1 is an SEM image of the surface morphology of a film formed according to Example 2A.
Figure 2:
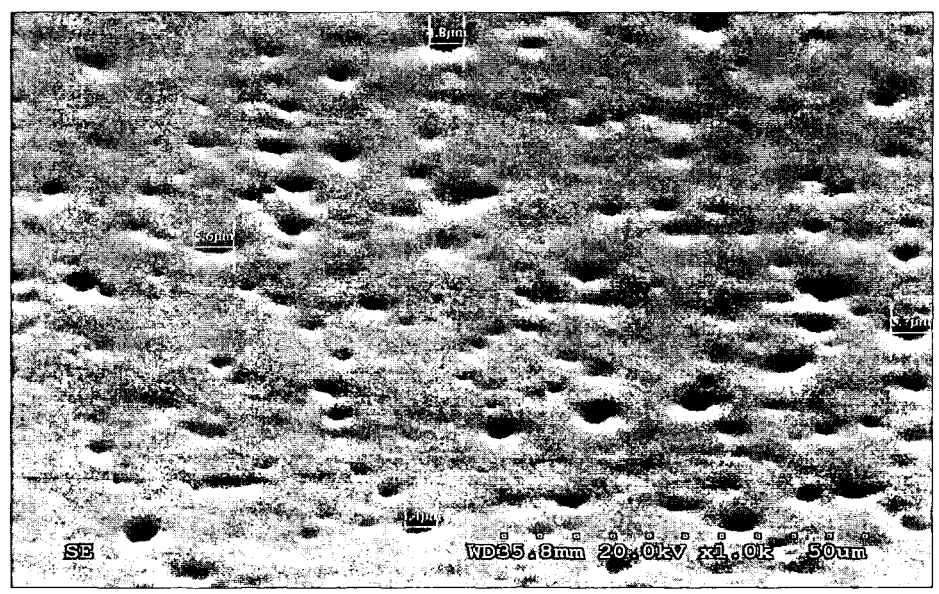
FIG. 2 is an SEM image of the surface morphology of a film formed according to Example 2B.
Figure 3:
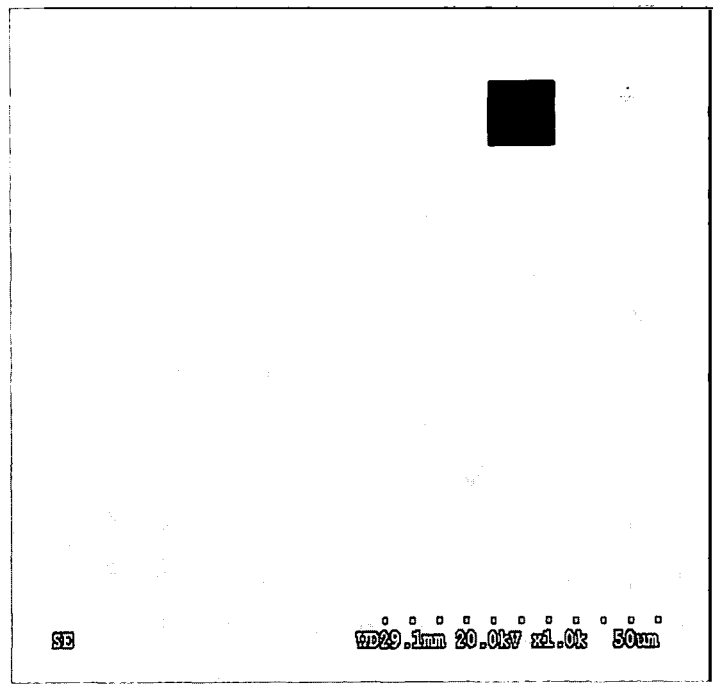
FIG. 3 is an SEM image of the surface morphology of a film formed according to Example 2C.
Figure 4:
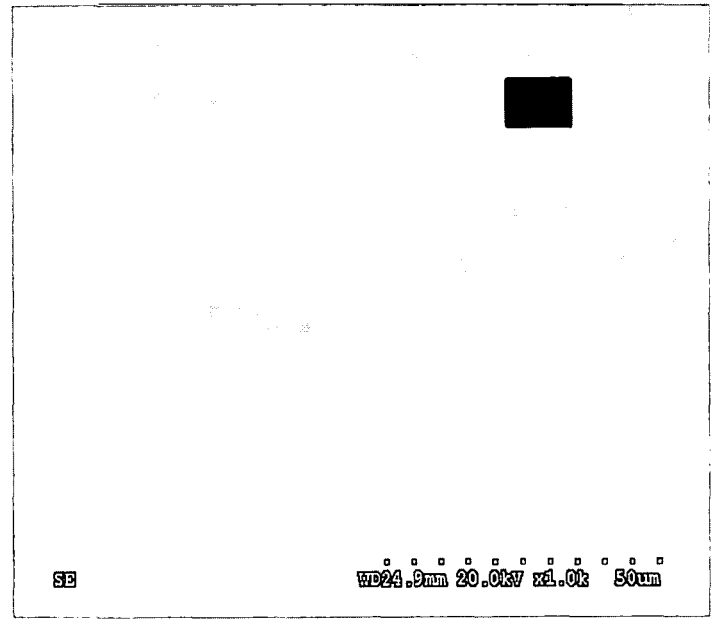
FIG. 4 is an SEM image of the surface morphology of a film formed according to Example 2D.
Figure 5:
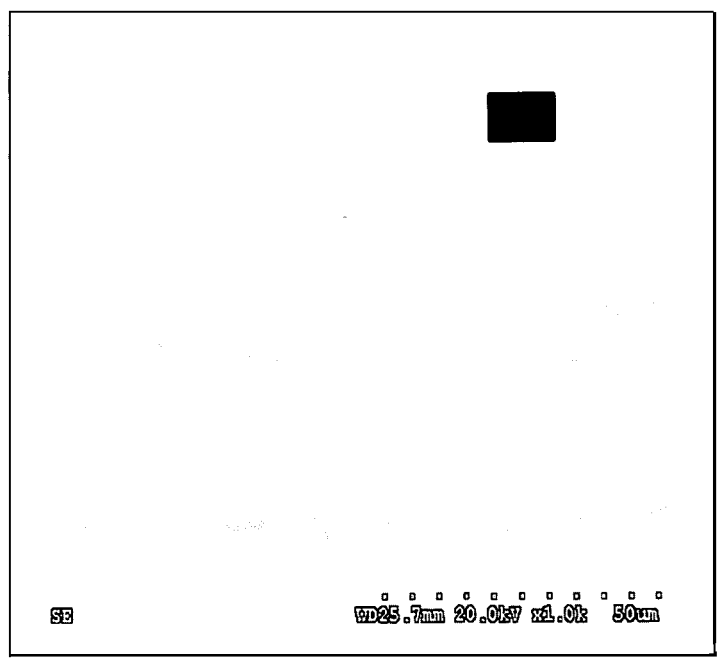
FIG. 5 is an SEM image of the surface morphology of a film formed according to Example 2E.

In some embodiments of the invention, the solvent comprises 2-butoxyethanol, butanol, 2-hexoxyethanol, or other hydroxylated solvents, as well as combinations thereof. The solvent may be present in an amount from about 4:1 to about 1:4 based on weight of solvent to solids or from about 3:1 to about 1:3.

The neutralizer may comprise without limitation a tertiary amine, secondary amine, a primary amine, sodium hydroxide, potassium hydroxide, a carbonate, or a combination thereof. Suitable tertiary amines for use in the present invention include without limitation dimethyl ethanol amine, 2-dimethylamino-2-methylpropanol, tributylamine, and combinations thereof. In some embodiments, the neutralizer is present in an amount from about 0.25 to about 1.5 equivalents on the phosphoric acid compound or from about 0.75 to about 1.0.

The adhesion promoter resin composition of the present invention may also include without limitation a phosphated epoxidized oil, a phosphated epoxidized polybutadiene copolymer, a phosphated acrylic copolymer, a phosphated polyester, a phosphated copolymer containing a copolymerized phosphate monomer, an epoxy phosphate, a phosphated epoxy-acrylic copolymer, a mono-alkyl ester of the foregoing, a di-alkyl ester of the foregoing, or a combination thereof. In some embodiments, the adhesion promoter resin composition may be present in an amount from about 0.5 to about 10.0% to coating solids or from about 2.0 to about 7.0%.

The epoxidized resin of the present invention in some embodiments may include a mono- and diglycidyl ether of a diol (such as without limitation dipropylene glycol diglycidyl ether, polypropylene glycol diglycidyl ether, ethylene glycol diglycidyl ether, neopentyl glycol diglycidyl ether, 1,4 butanediol diglycidyl ether, cyclohexanedimethanol diglycidyl ether, and 1,6 hexanediol diglycidyl ether), a mono- or di-glycidyl ester of a diacid (such as without limitation a diglycidyl ester of hexahydrophthalic anhydride), epoxidized soyabean oil, a bisphenol A glycidyl ether, epoxidized polybutadiene, or a combination thereof. In some embodiments, the epoxidized resin may be present in an amount from about 10% to about 75 wt % of the coating composition or from about 20% to about 50 wt %. In some embodiments, the adhesion promoter composition further comprises water.

The present invention also includes methods of coating a substrate comprising: a) preparing a coating composition by a method comprising: i) mixing an epoxidized resin and a solvent to form a mixture; ii) adding a phosphoric acid compound to the resulting mixture to form a phosphate ester; iii) adding water to partially hydrolyze the phosphate ester; and iv) adding a neutralizer to form an adhesion promoter resin; b) blending the adhesion promoter resin with a non-bisphenol A based film forming resin to form a coating composition; and c) applying the coating composition to the substrate. In some embodiments, the phosphoric acid compound can be without limitation phosphoric acid, superphosphoric acid, polyphosphoric acid, $P_2O_5$, or a combination thereof.

The methods, the adhesion promoter resin compositions and the coating compositions described herein may include any of the features described throughout this application. The non-bisphenol A based film forming resin may be a conventional coating system that is typically used as a coating composition, such as a latex coating composition (including for example a styrene acrylic latex composition), a polyester coating composition, a polyolefin coating composition, a polyurethane coating composition, a polyacrylic coating composition, a polycarbonate coating composition, a polyurea coating composition, the coating compositions of any of commonly-owned published applications WO 2010/100122, WO 2010/100121 or WO 2010/097353, or a combination thereof.

In some embodiments, the adhesion promoter resin composition may be blended with the non-bisphenol A based film forming resin in an amount from about 0.5% to about 10% based on total polymer solids, or from about 2% to about 6% on total polymer solids.

In addition, the present invention includes coating compositions prepared by a method comprising: a) preparing an adhesion promoter composition by a method comprising: i) mixing an epoxidized resin and a solvent to form a mixture; ii) adding a phosphoric acid compound to the resulting mixture to form a phosphate ester; iii) adding water to partially hydrolyze the phosphate ester; and iv) adding a neutralizer to form the adhesion promoter resin; b) blending the adhesion promoter resin with a non-bisphenol A based film forming resin to form a coating composition. The methods, the adhesion promoter compositions and the coating compositions described herein may include the features described throughout this application.

Still further, the present invention includes substrates, such as cans and packaging, coated with the coating compositions and/or by the methods of the present invention.

The non-bisphenol A based film forming resins, the adhesion promoter resin compositions and the coating compositions of the invention can include conventional additives known to those skilled in the art, such as without limitation, additives to control foam, reduce equilibrium and dynamic surface tension, control rheology and surface lubricity. Amounts can vary depending on desired coating application and performance in any manner known to those skilled in the art. The adhesion promoter resin compositions can also include additives, such as without limitation, solution acrylics, siloxanes, water-borne polyesters, phenolics or other surface active materials.

One or more coating compositions of the invention are applied to a substrate in some embodiments, such as for non-limiting example, cans, metal cans, packaging, containers, receptacles, can ends, or any portions thereof used to hold or touch any type of food or beverage. In some embodiments, one or more coatings are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition contains, for non-limiting example, between about 10% and about 30% by weight polymeric solids relative to about 70% to about 90% water including other volatiles such as, without limitation, minimal amounts of solvents, if desired. For some applications, typically those other than spraying, the aqueous polymeric dispersions can contain, for non-limiting example, between about 20% and about 60% by weight polymer solids. Organic solvents are utilized in some embodiments to facilitate spray or other application methods and such solvents include, without limitation, n-butanol, 2-butoxy-ethanol-1, xylene, toluene, and mixtures thereof. In some embodiments, n-butanol is used in combination with 2-butoxy-ethanol-1. The coating compositions of the present invention are pigmented and/or opacified with known pigments and opacifiers in some embodiments. For many uses, including food use for non-limiting example, the pigment is titanium dioxide. The resulting aqueous coating composition is applied in some embodiments by conventional methods known in the coating industry. Thus, for non-limiting example, spraying, rolling, dipping, and flow coating application methods can be used for both clear and pigmented films. In some embodiments, after application onto a substrate, the coating is cured thermally at temperatures in the range from about 130° C. to about 250° C., and alternatively higher for time sufficient to effect complete curing as well as volatilizing of any fugitive component therein.

For substrates intended as beverage containers, the coating are applied in some embodiments at a rate in the range from about 0.5 to about 15 milligrams of polymer coating per square inch of exposed substrate surface. In some embodiments, the water-dispersible coating is applied at a thickness between about 1 and about 25 microns.

EXAMPLES

The invention will be further described by reference to the following non-limiting examples. It should be understood that variations and modifications of these examples can be made by those skilled in the art without departing from the spirit and scope of the invention.

Example 1

Preparation of Adhesion Promoter Composition
Phosphorylation Stage

A premix was prepared by adding 24.0 parts of epoxidized polybutadiene (Poly BD 600) and 34.2 parts of butyl cellosolve to a reaction flask and heated to 70° C. with medium stirring and a nitrogen blanket. The butyl cellosolve was used as a diluent solvent and also to buffer the reaction to prevent gellation. To this mixture was added a premix of 1.0 parts of superphosphoric acid (105% phosphoric acid) and 3.29 parts of butyl cellosolve. Superphosphoric acid was used since it is a concentrated form of an acid without water present to interfere with the oxirane ring reaction. The components were allowed to react and within five minutes the exothermic reaction reached 76° F. The temperature was then slowly raised to 120° F. over 20 minutes and held for 3 hours. As the reaction proceeded, mono-, di- and tri- esters formed and consumed most of the available acid groups on the acid. Samples were taken hourly and tested for acid number to monitor the reaction. Starting from a theoretical acid number of 43.6, the final acid number was 3.2. A final sample was also tested for the percent oxirane to check for any remaining oxirane groups. Starting from a theoretical oxirane of 3.5%, the final value was 0.22%.

Hydrolysis Stage

The batch was cooled to 97° F. and 3.36 parts of water was added to the flask and held for 2 hours. Reacting with water broke up any di- and tri- esters of phosphoric acid back to all mono-esters which is an effective form for adhesion to metal substrates. Samples were taken hourly and tested for acid number. The final acid number was 39.1.

Emulsion Stage

While holding at greater than 95° F., a premix of 0.96 parts of dimethyl ethanol amine and 2.88 parts of water was slowly added to the flask and held for 20 minutes to neutralize the acid. The heat was then turned off and 30.31 parts of water was added over 30 minutes to form the final emulsion. The batch was air-cooled to room temperature and checked for acid number and percent solids. The final values were 39.1 acid number and 26.3% solids.

Example 2

The following examples resulted in improved film appearance when using the adhesion promoter compositions of the present invention.

Example 2A

Control Coating

To 2415.3 g of a styrene acrylic latex (23.5% NV) was added 141.7 g of demineralized water, followed by a mixture of 349.41 g of butanol, 85.5 g of butyl cellosolve, 7.13 g of hexyl cellosolve, and 5.7 g of Surfynol 420, mixing well during addition.

Example 2B

Coating with Adhesion Promoter Composition

To 2342.8 g of a styrene acrylic latex (23.5% NV) was added 221.4 g of demineralized water and 68.4 g of the adhesion promoter composition from Example 1. Then, a mixture of 349.41 g of butanol, 59.45 g of butyl cellosolve, 7.13 g of hexyl cellosolve, and 5.7 g of Surfynol 420 was added, mixing well during addition.

Examples 2C-2E

Coating Modifications

To 3400.0 g of material from Example 2B was added the materials indicated in the table below, mixing well after addition.

| Example | Material | Amount |
|---------|----------|--------|
| C | solution acrylic[1] | 2.9 g |
| D | polyester[2] | 71.8 g |
| E | Z-6070 silane | 17.0 g |
|   | Z-6124 silane | 17.0 g |

[1] an acid-functional solution acrylic flow modifier
[2] an aqueous polyester dispersion

Example 2F

Coating Testing

Material from Examples 2A-2E above were sprayed onto two-piece beverage cans and evaluated for performance.

Spray: cans with 125 mg/can film weight evaluated via enamel rater.

Seltzer Delamination: cans sprayed at 100 mg/can film weight, enamel rated and then filled with seltzer water. Evaluated for surface delamination; 0=no delamination, 10=severe delamination Cans filled with Gatorade and retorted for 60 min at 250 F and evaluated for blush, color pick-up and drop and damage.

Blush: 0=no whitening, 5=opaque white
Color: 0=no color, 5=significant color
Drop and Damage by enamel rating after drop onto wedge.

| Example | Spray | Seltzer delamination | Blush | Color | Drop and Damage |
|---------|-------|---------------------|-------|-------|-----------------|
| 2A | 3.0 | 8 | 0 | 0 | 42.6 |
| 2B | 1.5 | 0 | 0 | 0 | 9.4 |
| 2C | 2.1 | 0 | 0 | 0 | 20.3 |
| 2D | 5.5 | 0 | 0 | 0 | 14.9 |
| 2E | 2.9 | 0.5 | 0 | 0 | 13.3 |

Surface Morphology:

Below are SEM pictures of the film surface morphology of the Examples 2A-2E. Smooth surfaces with limited pits are desired.

Example 3

Coating with Adhesion Promoter Composition

With nitrogen passed throughout, butyl dioxitol and 89.9% phosphoric acid were charged and heated to 70° C. To the mixture, a premix of a diglycidyl ester of hexahydrophthalic anhydride and butyl dioxitol were added over 180 minutes at 70-75° C. The resulting mixture was held for 60 minutes until an acid number of 35 mg KOH/gram was obtained. Next, a mixture of deionized water and butyl dioxitol were added and the mixture was heated to 140-142° C. The mixture was held for 60 minutes and sampled for an acid number of 71 mg KOH/gram. The resulting mixture was cooled to 95° C. and dimethylethanolamine was added. The batch was allowed to exotherm to 100° C. and it was held for 30 minutes at 90-100° C. The weight percentages were:

| MATERIAL | WEIGHT | WEIGHT PERCENTAGE |
|---|---|---|
| Butyl dioxitol | 262.01 | 26.20% |
| Phosphoric acid (89.9%) | 64.80 | 6.48% |
| Epalloy 5200 | 441.76 | 44.18% |
| Butyl dioxitol | 115.18 | 11.52% |
| Deionized water | 24.09 | 2.41% |
| Butyl dioxitol | 38.17 | 3.82% |
| Dimethylethanolamine | 53.99 | 5.40% |

The resulting composition was analyzed for its solid content, viscosity and acid value. The results were:

| SOLIDS CONTENT | VISCOSITY | ACID VALUE |
|---|---|---|
| 60.2% | 9 poise at 25° C. | 110 mg KOH/gram solids |

Example 4

Three coating compositions were prepared by cold mixing the components and evaluated after application onto aluminum can stock as shown in the table below. The coating composition in the first column was prepared using a standard aromatic epoxy phosphate without an adhesion promoter of the invention. The coating composition in the second column was prepared using a non-epoxy adhesion promoter at an addition level of 2.2% of the total solids content. The coating composition in the third column was prepared using a non-epoxy adhesion promoter at an addition level of 1.1% of the total solids content.

| Component | Standard | Weight % Full level of adhesion promoter | Half level of adhesion promoter |
|---|---|---|---|
| Polyester | 53 | 53 | 53 |
| Dimethylethanolamine | 0.9 | 0.9 | 0.9 |
| Adhesion promoter | 0 | 2.2 | 1.1 |
| Epoxy phosphate | 2 | 0 | 0 |
| BYK333 surfactant | 0.2 | 0.2 | 0.216 |
| Drewplus 210-694 defoamer | 0.2 | 0.2 | 0.2 |
| 2-butoxy ethanol | 0.2 | 0.2 | 0.2 |
| Synocryl 811S vinyl polymer | 1 | 1 | 1 |
| Cymel 3745 crosslinker | 15 | 15 | 15 |
| Wax | 2.3 | 2.3 | 2.3 |
| Water | 25.2 | 25 | 26.1 |

| | Standard | Full level of adhesion promoter | Half level of adhesion promoter |
|---|---|---|---|
| 60° gloss | | | |
| IBO | 122-131 | 120-128 | 117-124 |
| Overstove | 118-123 | 104-109 | 103-106 |
| Altek slip | | | |
| Deco | 0.04-0.05 | 0.03-0.04 | 0.03-0.04 |
| IBO | 0.06-0.07 | 0.04-0.05 | 0.04-0.05 |
| Overstove | 0.09-0.10 | 0.05-0.06 | 0.05-0.06 |
| MEK | | | |
| Deco | 16-19 | 19-26 | 25-28 |
| IBO | 100+ | 100+ | 100+ |
| Overstove | 100+ | 100+ | 100+ |
| Wedge bend % non breakdown | 88% | 90% | 92% |
| Pencil hardness | | | |
| IBO | >7H | >7H | >7H |
| Overstove | 6H | >7H | >7H |
| Blush resistance | | | |
| Joy 95° C./30' | 0-1 | 0 | 0 |
| Water | 0 | 0 | 0 |
| Calsberg | 0-1 | 0 | 0 |

| 202 neck adhesion | Neck | SW | Neck | SW | Neck | SW |
|---|---|---|---|---|---|---|
| Joy 95° C./30' | 0 | 0 | 0 | 0 | 0 | 0 |
| Water boil 10' | 0 | 0 | 0 | 0 | 0 | 0 |
| Carlsberg 60° C./30' | 0 | 0 | 0 | 0 | 0 | 0 |

The data above shows that the addition of a non-epoxy adhesion promoter at addition levels of 1.1 and 2.2% of total solids give adhesion performance equivalent to that of coatings formulated with a standard aromatic epoxy phosphate.

What is claimed is:

1. A sprayable coating composition for forming a food or beverage contact coating, the coating composition comprising:
   a non-bisphenol A based film forming resin;
   an adhesion promoter composition present in an amount from about 0.5% to about 10% by weight total solids content, wherein the adhesion promoter composition includes (i) a monophosphate ester hydrolysis product formed from water and a di- or tri-phosphate ester phosphorylation product of an epoxidized resin and a phosphoric acid compound and (ii) a basic neutralizer,
   wherein the coating composition is free of bisphenol A.

2. The coating composition of claim 1, wherein the basic neutralizer is present in an amount from about 0.25 to about 1.5 equivalents of the phosphoric acid compound.

3. The coating composition of claim 2, wherein the basic neutralizer is present in an amount from about 0.75 to about 1.0 equivalents of the phosphoric acid compound.

4. The coating composition of claim 1, further comprising a solvent selected from the group consisting of 2-butoxyethanol, butanol, 2-hexoxyethanol, and a combination thereof.

5. The coating composition of claim 1, wherein the basic neutralizer is selected from the group consisting of a tertiary amine, a secondary amine, a primary amine, sodium hydroxide, potassium hydroxide, a carbonate, and a combination thereof.

6. The coating composition of claim 5, wherein the tertiary amine is selected from the group consisting of dimethyl ethanol amine, 2-dimethylamino-2-methylpropanol, tributylamine, and a combination thereof.

7. The coating composition of claim 1, further comprising water.

8. The coating composition of claim 1, wherein the non-bisphenol A based film forming resin is selected from the group consisting of a latex coating composition, a polyester coating composition, a polyolefin coating composition, a polyurethane coating composition, a polyacrylic coating composition, a polycarbonate coating composition, a polyurea coating composition, and a combination thereof.

9. The coating composition of claim 1, wherein the phosphoric acid compound is selected from the group consisting of phosphoric acid, superphosphoric acid, polyphosphoric acid, $P_2O_5$, and a combination thereof.

10. The coating composition of claim 1, wherein the epoxidized resin is selected from the group consisting of a mono- or a diglycidyl ether of a diol, a mono- or a diglycidyl ester of a diacid, an epoxidized soybean oil, an epoxidized polybutadiene, and a combination thereof.

11. A method of coating a substrate comprising:
  a) preparing an adhesion promoter composition including
    (i) a monophosphate ester hydrolysis product formed from water and a di- or tri-phosphate ester phosphorylation product of an epoxidized resin and a phosphoric acid compound and (ii) a basic neutralizer, by a method comprising:
    (1) mixing the epoxidized resin and a solvent to form a mixture;
    (2) adding the phosphoric acid compound to the resulting mixture to form the di- or tri-phosphate ester phosphorylation product;
    (3) adding water to break up di- or tri-phosphate esters of the di- or tri-phosphate ester phosphorylation product to mono-phosphate esters and to partially hydrolyze the mono-phosphate esters; and
    (4) adding the basic neutralizer to form the adhesion promoter composition;
  b) blending the adhesion promoter composition with a non-bisphenol A based film forming resin to form a coating composition, wherein the coating composition is free of bisphenol A and wherein the adhesion promoter composition is present in an amount from about 0.5% to about 10% by weight total solids content; and
  c) applying the coating composition to the substrate.

12. The method of claim 11, wherein the solvent is selected from the group consisting of 2-butoxyethanol, butanol, 2-hexoxyethanol, and a combination thereof.

13. The method of claim 11, wherein the basic neutralizer is selected from the group consisting of a tertiary amine, a secondary amine, a primary amine, sodium hydroxide, potassium hydroxide, a carbonate, and a combination thereof.

14. The method of claim 13, wherein the tertiary amine is selected from the group consisting of dimethyl ethanol amine, 2-dimethylamino-2-methylpropanol, tributylamine, and a combination thereof.

15. A substrate coated with the coating composition of claim 1.

* * * * *